United States Patent [19]

Yoshioka

[11] Patent Number: 4,941,062
[45] Date of Patent: Jul. 10, 1990

[54] MAGNETIC HEAD POSITIONING MECHANISM FOR MAGNETIC DISK DEVICE

[75] Inventor: Koichi Yoshioka, Hyogo, Japan

[73] Assignee: Mitsubishi Denki Kabushiki Kaisha, Tokyo, Japan

[21] Appl. No.: 263,909

[22] Filed: Oct. 28, 1988

[30] Foreign Application Priority Data

Nov. 17, 1987 [JP] Japan .................. 62-291324

[51] Int. Cl.⁵ .............................. G11B 5/55
[52] U.S. Cl. ................................. 360/106
[58] Field of Search .......................... 360/106

[56] References Cited

U.S. PATENT DOCUMENTS 4,346,416 8/1982 Riggle ........................... 360/106
4,805,055 2/1989 Wright ...................... 360/97.01 X

FOREIGN PATENT DOCUMENTS 61-82386 4/1986 Japan .

Primary Examiner—A. J. Heinz
Attorney, Agent, or Firm—Wolf, Greenfield & Sacks

[57] ABSTRACT

A magnetic head positioning mechanism for a magnetic disk device having a pivot mechanism which comprises a pivot shaft supported by a housing at least having two opposite plates, a carriage which is swingably supported by the pivot shaft, head-arms which are fixed to the carriage on base ends thereof and are attached magnetic heads at tip ends thereof, and a driving portion which is connected to the carriage at the opposite side of the head-arms; the carriage, which is positioned at the rotational center of the pivot mechanism, is composed of materials having higher specific gravity than the head-arms; the center of gravity of the pivot mechanism is very close to the pivot shaft as the rotational center, therefore the stable driving control is effected even when the magnetic device is arranged such that the head-arms pivot on a horizontal axis.

11 Claims, 3 Drawing Sheets

PRIOR ART

MAGNETIC HEAD POSITIONING MECHANISM FOR MAGNETIC DISK DEVICE

BACKGROUND OF THE INVENTION

1. Field of the Invention

The present invention relates to a magnetic head positioning mechanism for a magnetic disk device, and more particularly to a magnetic head positioning mechanism capable of positioning of a magnetic head in the magnetic disk device which is used as a peripheral or terminal device in an electronic computer system or the like.

2. Description of the Prior Art

The rapid advancement of the computer technology makes rapid development of the magnetic disk devices, which are internal or external memory devices of the peripheral or terminal devices of the computer. In the magnetic disk device, with increasing capability of high density data recording of the storage medium, the magnetic head positioning mechanism is required to more precisely position the magnetic head in place.

One example of the conventional magnetic head positioning mechanism, is "a positioning mechanism of magnetic disk device" which is disclosed in Japanese Laid-Open No. 61-82386. This prior art will be described with reference to FIG. 1 which shows a cross-section of the magnetic head positioning mechanism, FIG. 2 which shows a side view of the mechanism in FIG. 2 when the pivot shaft thereof is used in horizontal position, and FIG. 3 which shows a right side view of FIG. 1. The magnetic head positioning mechanism generally comprises a housing 1 having at least two plates opposing each other, and a pivot mechanism 2 supported between the plates of the housing 1. The pivot mechanism 2 comprises a carriage 3 which is supported by means of a pivot shaft 4 and bearings 5 to swing about a longitudinal axis of the pivot shaft 4, a plurality of head-arms 6 which are fixed at base ends thereof to one side of the carriage 3, a plurality of magnetic heads 7 which are attached to opposite tip ends of the head-arms 6, a coil 8 which is arranged on the opposite side of the carriage 3. A pair of magnetic circuits are secured within the housing 1, 1, each circuit facing the turns of the coil 8. The magnetic circuits 9, 9 and the coil 8 constitute a voice-coil motor 10 which drives the mechanism 2. Further, numeral 11 denotes a bracket for supporting one of the magnetic circuits 9.

The operation of the magnetic head positioning mechanism having the above-mentioned structure will be described hereinafter. The coil 8 produces a repulsive force against the magnetic circuit 9, 9 when a driving current is supplied to the coil 8 of the voice-coil motor 10, and the pivot mechanism 2 swings about the pivot shaft 4.

Concerning the magnetic head positioning mechanism which operates as mentioned above, a controlling circuit (not shown) determines an amount of angle by which the pivot mechanism 2 pivots on the basis of processing data for positioning the magnetic head, and performs positioning of the magnetic head 7. Generally, the magnetic head positioning mechanism comprises the carriage 3 and the head-arms 6 which are made from the same material. Light and highly rigid metal materials such as aluminum (Al) and magnesium (Mg) have been used. The coil 8 is made from a copper (Cu) wire or an aluminum wire (Al). In the pivot mechanism 2 which is made from such materials, a distance L1 from the center of the pivot shaft 4 to the tip ends of the head-arms 6 is much longer than a distance L2 from the center of the pivot shaft 4 to the end surface of the coil 8, therefore the center of gravity of the pivot mechanism 2 is not on the pivotal axis of the mechanism 2 but at somewhere on the head-arms 6.

Since a conventional magnetic head positioning mechanism is constituted as described hereinbefore, the driving force required for driving the mechanism is independent of its pivotal direction if the magnetic head positioning mechanism is arranged in such a way that the head arms 6 pivot on a vertical axis as shown in FIG. 1. On the contrary, if the magnetic head positioning mechanism is arranged in such a way that the head arms 6 pivot about a horizontal axis as shown in FIG. 2, since the rotational center is not coincident with the center of gravity of the pivot mechanism 2, the gravitational force acting on the head arms is larger than that acting on the coil 8. Accordingly, the driving force required in the direction a is smaller than that in the direction b, therefore it is difficult to control the magnetic head positioning mechanism with good stability.

SUMMARY OF THE INVENTION

The present invention was made to solve the above-mentioned problems. It is an object of this invention to provide a magnetic head positioning mechanism in which driving of the positioning mechanism is free from influence of gravitational force.

In order to accomplish the above object, the magnetic head positioning mechanism of the present invention comprises a carriage and head-arms in which the specific gravity of the material of the carriage is higher than that of the material forming the head-arms so that center of gravity of the mechanism is much closer to the pivotal axis. Accordingly, since the carriage is made from the material having high specific gravity, the center of gravity approaches the rotational center of the pivot.

DETAILED DESCRIPTION OF THE PREFERRED EMBODIMENTS

A preferred embodiment of the present invention will be described hereinafter with reference to the attached drawings.

Figure 1:
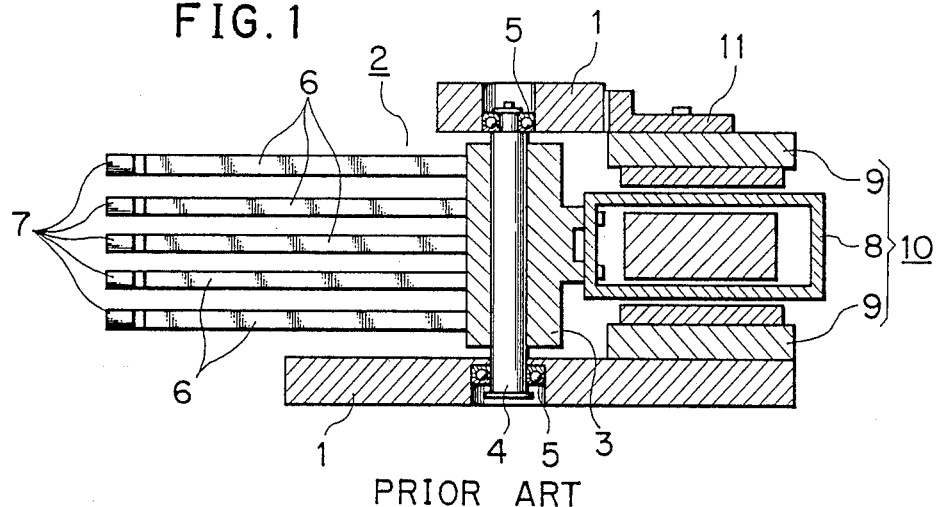
FIG. 1 is a cross sectional view showing one example of a conventional magnetic head positioning mechanism.
Figure 2:
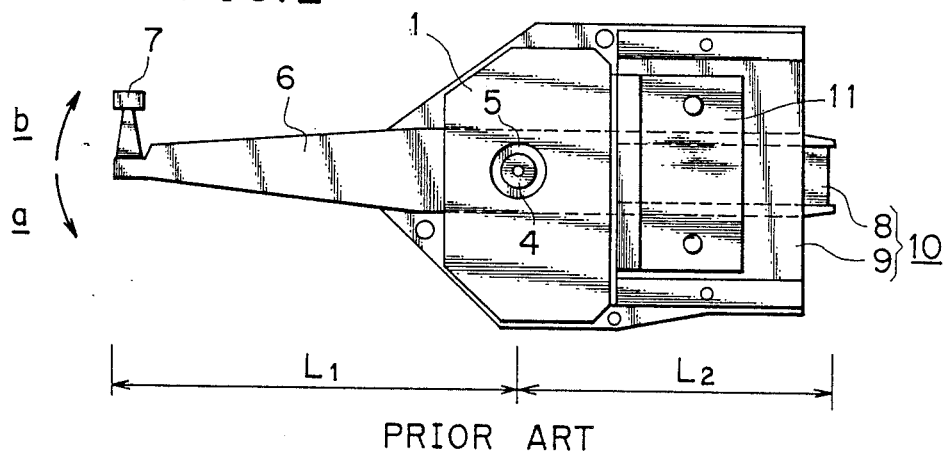
FIG. 2 is a side view of the conventional magnetic head positioning mechanism shown in FIG. 1 when the pivot shaft is used in horizontal position.
Figure 3:
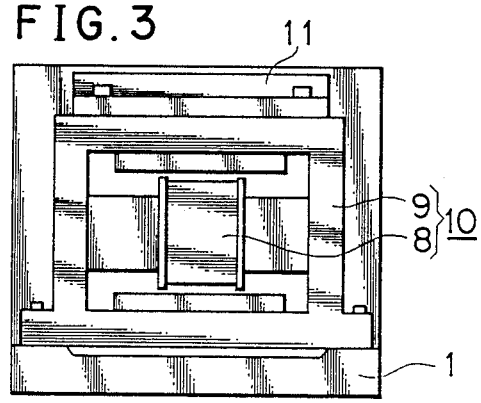
FIG. 3 is a right side view of the conventional magnetic head positioning mechanism shown in FIG. 2.
Figure 4:
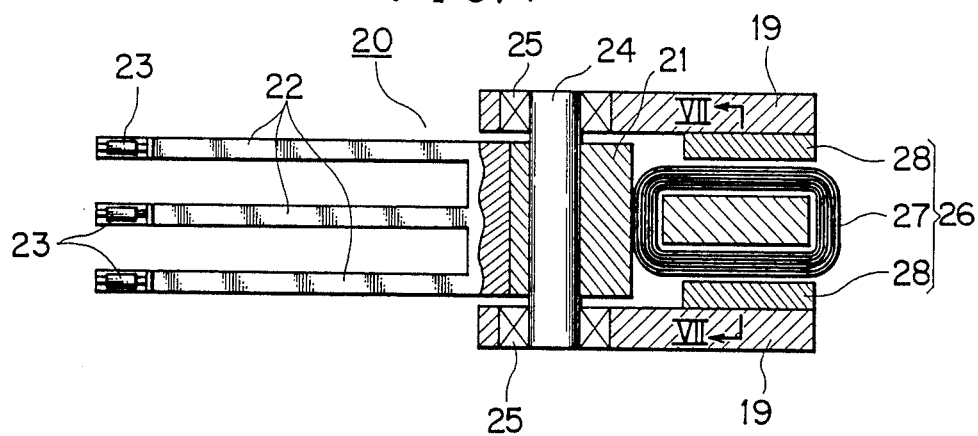
FIG. 4 is a cross sectional view showing a magnetic head positioning mechanism, taken along the line IV—IV of FIG. 5.
Figure 5:
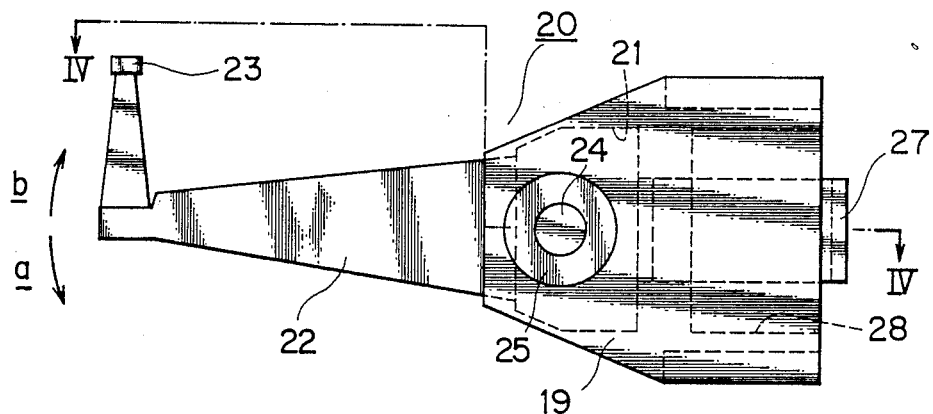
FIG. 5 is a side view of the magnetic head positioning mechanism of FIG. 4 when the pivot shaft is used in horizontal position.
Figure 7:
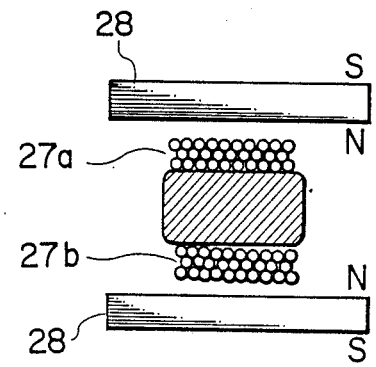
FIG. 7 is a cross sectional view taken along the line VII—VII in FIG. 4.
Figure 6:
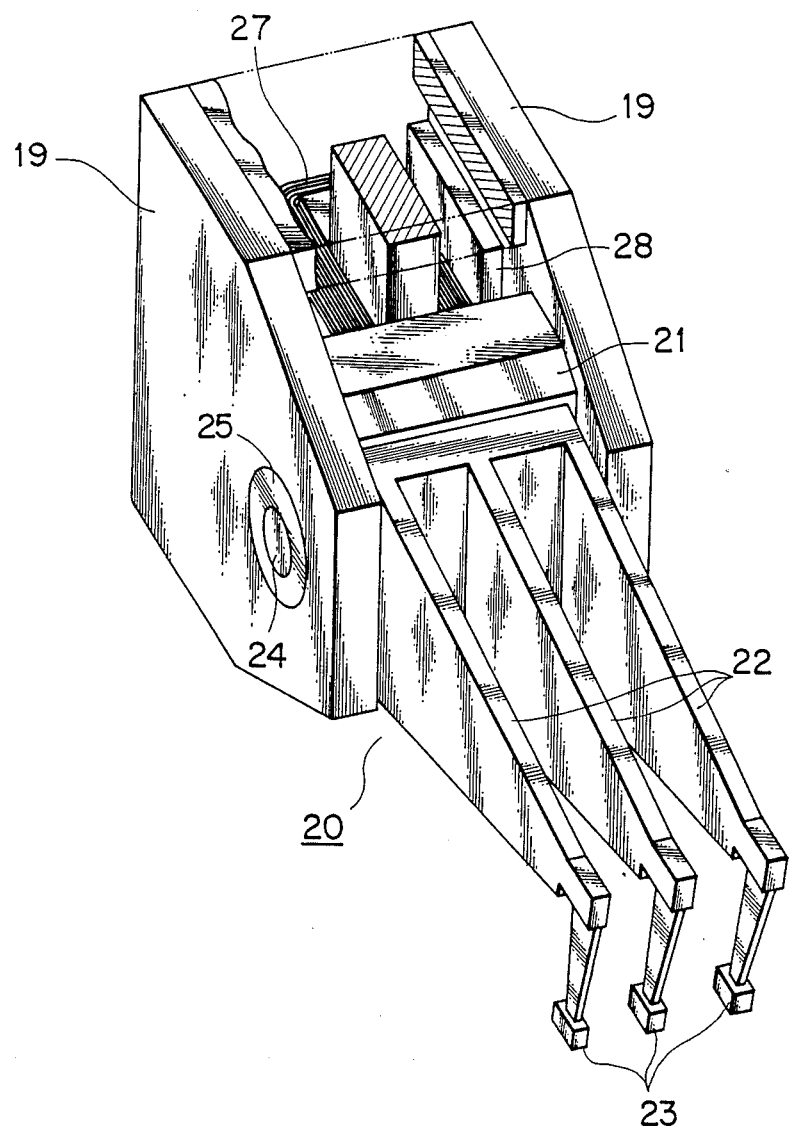
FIG. 6 is a perspective view showing the magnetic head positioning mechanism of one embodiment of the present invention shown in FIGS. 4 and 5.

In FIGS. 4 to 6 which show one embodiment of this invention, a magnetic head positioning mechanism schematically comprises a housing 19 and a pivot mechanism 20. The pivot mechanism 20 comprises a carriage 21 which is formed of copper (Cu), head-arms 22 which are formed of aluminum (Al), magnetic heads 23 which are attached to the tip ends of the head-arms 22, a pivot shaft 24 which is supported by the housing 19, bearings 25 rotatably supporting the pivot shaft 24, and a voice-coil motor 26 which causes the head-arms 22 connected to the carriage 21 to pivot. The voice-coil motor 26 comprises a coil 27 which is connected to the carriage 21 on the opposite side of the head-arms 22, and a pair of magnetic circuits 28 and 28 which are provided on the inner surfaces of the housing 19 and 19 opposite to both sides of the coil 27, respectively.

The magnetic head positioning mechanism having the above-mentioned structure keeps its balance of a mass of the head-arms 22 side and a mass of the coil 27 side with respect to the rotational center of the pivot mechanism 20. Since the carriage 21 made of copper can alleviate unbalance between the weight of the head arms 22 and the weight of the coil 27 with respect to the rotational axis, the weight of both sides of the pivot shaft 24 nearly keeps balance though the head-arms 22 are much longer than the coil 27. Accordingly, even when the magnetic head positioning mechanism is arranged so that pivot mechanism 20 pivots on the horizontal axis of 24, the pivot mechanism 20 can still be operated with nearly equal forces regardless of the rotational directions a or b in FIG. 5.

Although the carriage 21 is made of copper (Cu) in the above-mentioned embodiment, it may also be made from other materials having high specific-gravity such as tungsten (W-wolfram).

Further, although the voice-coil motor 26 is used to implement a driving portion, a stepping motor can also be used for the same effect as in the embodiment described above.

With a magnetic head positioning mechanism according to the invention, since the carriage is made of materials of high specific gravity as compared to the head arms, the center of gravity of the pivot mechanism can be concentrated close to the rotational axis thereof to eliminate a problem of unequal driving forces required depending on a rotational direction when the magnetic head positioning mechanism is used with the pivot shaft being in horizontal position. Thus the effect of the weights of the head arm 22 and the coil 27 to the driving force required for the mechanism can be minimized sufficiently.

What is claimed is:

1. A magnetic head positioning mechanism for a magnetic disk device having a pivot mechanism which comprises a pivot shaft supported within a housing, a carriage swingably supported by said pivot shaft, head-arms fixed to said carriage at base ends thereof and having attached magnetic heads at tip ends thereof, and a driving portion provided on the opposite end of said carriage with the pivot shaft support being located between the tip ends and the driving portion;
wherein the portion of said carriage positioned at the rotational center of said pivot mechanism and including the entire pivot shaft support area of said carriage is made of materials having higher specific gravity than said head-arms.

2. A magnetic head positioning mechanism for a magnetic disk device according to claim 1, wherein the portion of said carriage positioned at the rotational center of said pivot mechanism is made of copper, and said head-arms are made of aluminum.

3. The magnetic head positioning mechanism for a magnetic disk device according to claim 1 wherein the driving portion comprises a coil affixed to said carriage at the portion thereof positioned at the rotational center including the pivot shaft support, said coil extending outboard in a direction opposite from said magnetic heads.

4. A magnetic head positioning mechanism for a magnetic disk device according to claim 1, wherein said driving portion is a voice-coil motor comprising a pair of magnetic circuits and said housing has a bifurcated portion partially encompassing said carriage, said magnetic circuits being affixed one to each of the furcations of said housing, respectively, and a coil which is arranged between said magnetic circuits extending outbound in a direction opposite from said magnetic heads.

5. A magnetic head positioning mechanism for a magnetic disk device according to claim 1 wherein the center of gravity of the pivot mechanism is very close to the rotational center of the pivot shaft, whereby stable driving control is effected even when the magnetic device is arranged so that the head-arms pivot on a horizontal axis.

6. A magnetic head positioning mechanism for a magnetic disk device according to claim 1 wherein the center of gravity of the pivot mechanism is substantially at the rotational center of the pivot shaft.

7. A magnetic head positioning mechanism for a magnetic disk device having a pivot mechanism which comprises a pivot shaft supported within a housing, a carriage made of tungsten and swingably supported by said pivot shaft, head arms made of aluminum fixed to said carriage at base ends thereof and attached magnetic heads at tip ends thereof, and a driving portion provided on the opposite end of said carriage; whereby the center of gravity of the pivot mechanism is concentrated close to the rotational axis thereof.

8. A magnetic head positioning mechanism for a magnetic disk device comprising: a pivot mechanism which comprises a pivot shaft supported within a housing, a carriage swingably supported by said pivot shaft, head-arms fixed to said carriage at base ends thereof and having attached magnetic heads at tip ends thereof, and a driving portion provided on the opposite end of said carriage with the pivot shaft support being located between the tip ends and the driving position;
said carriage having a pivot shaft support portion disposed about said pivot shaft said support portion including means constructed of a material having a higher specific gravity than that of said head-arms so that the center of gravity of the head positioning mechanism, excluding the driving portion, substantially coincides with the rotational center of the pivot shaft.

9. A magnetic head positioning mechanism as set forth in claim 8 wherein said carriage is made of copper and said head-arms are made of aluminum.

10. A magnetic head positioning mechanism as set forth in claim 8 wherein said carriage is made of tungsten and said head-arms are made of aluminum.

11. A magnetic head positioning mechanism as set forth in claim 8 wherein said pivot shaft support portion is disposed about the full circumference of said pivot shaft.

* * * * *